(No Model.) 2 Sheets—Sheet 1.
J. T. VAN GESTEL.
DYNAMO ELECTRIC MACHINE.
No. 408,768. Patented Aug. 13, 1889.
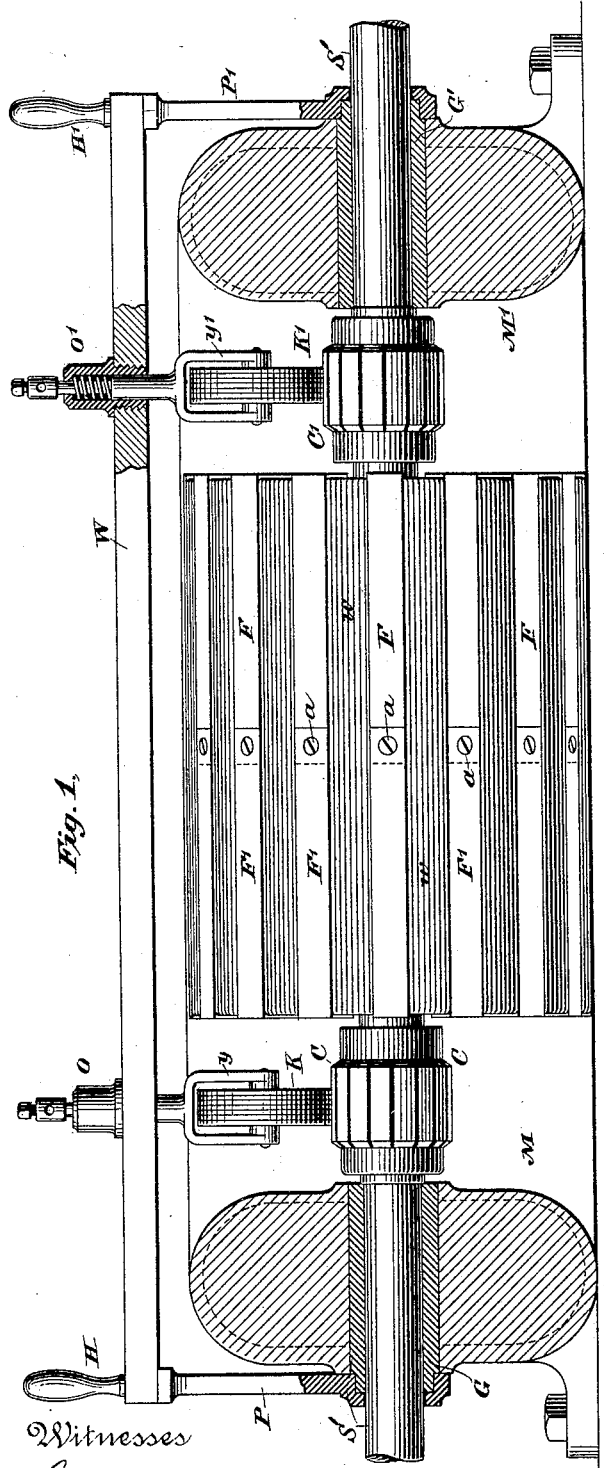
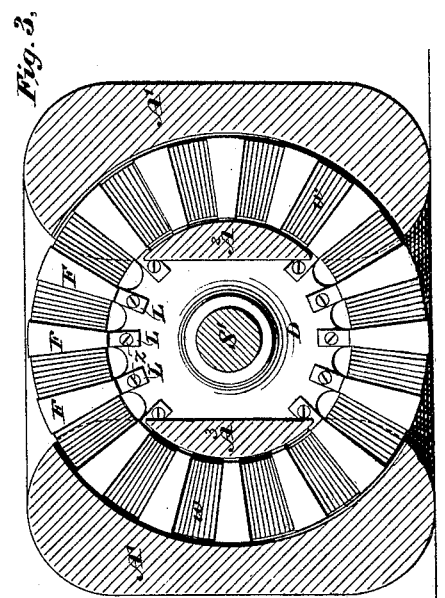
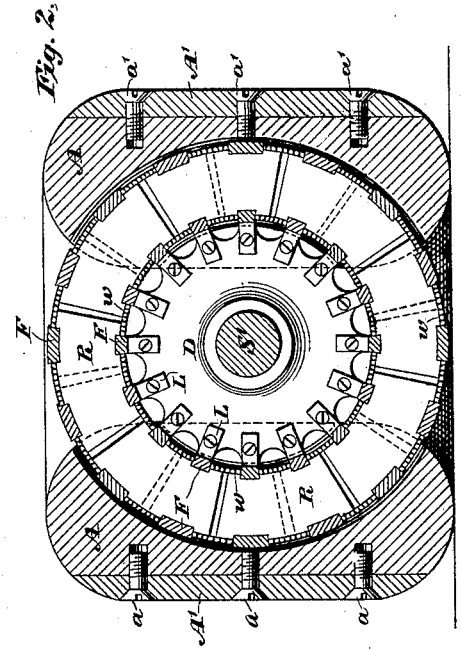
Witnesses
Geo. W. Breck
Edward Thorpe
Inventor
Jean Theodore Van Gestel
By his Attorneys
Wiederscheim & Kintner

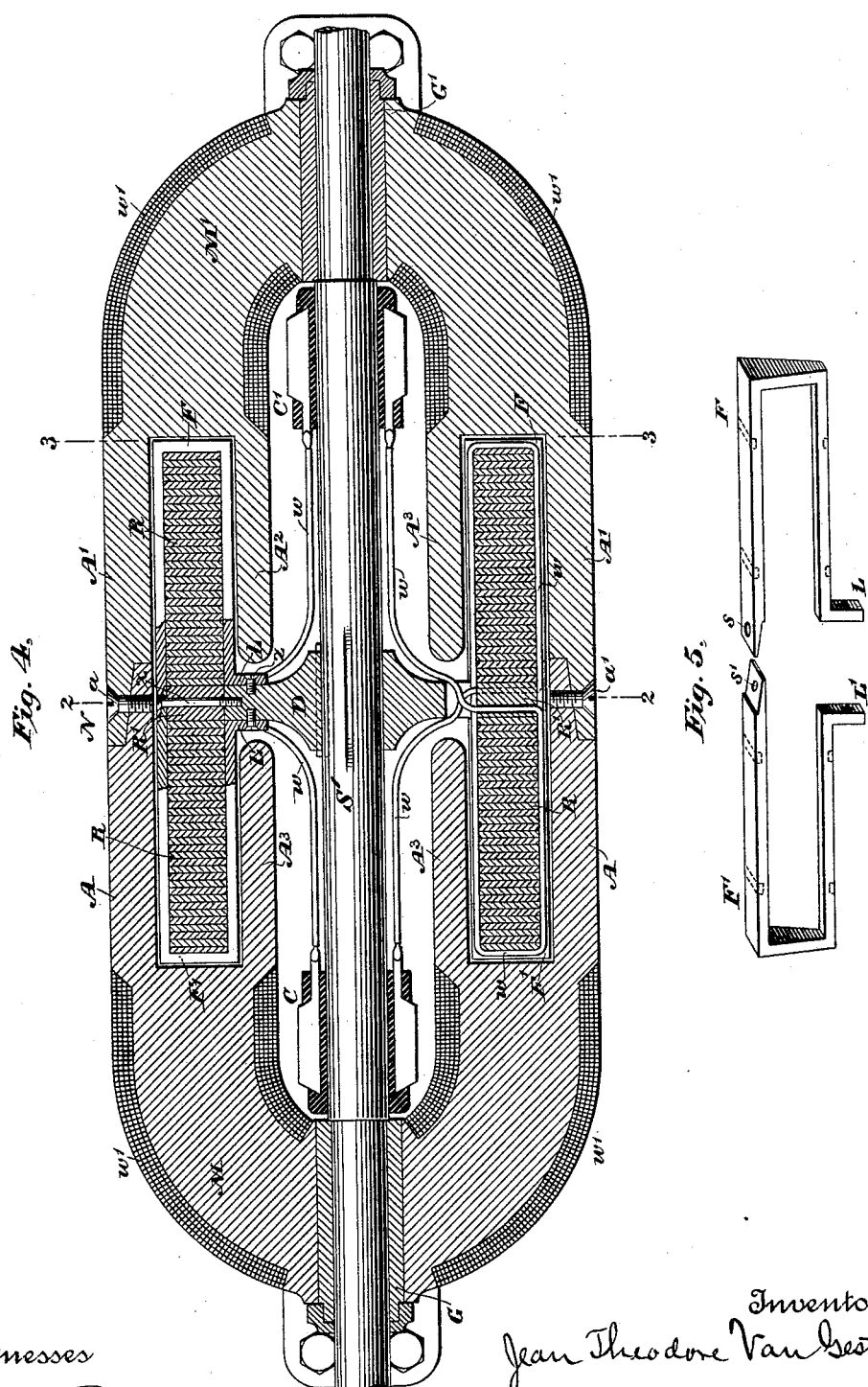

United States Patent Office.

JEAN THEODORE VAN GESTEL, OF NEW YORK, N. Y.

DYNAMO-ELECTRIC MACHINE.

SPECIFICATION forming part of Letters Patent No. 408,768, dated August 13, 1889.

Application filed June 25, 1888. Serial No. 278,117. (No model.)

*To all whom it may concern:*

Be it known that I, JEAN THEODORE VAN GESTEL, a subject of the King of the Netherlands, residing at New York, county of New York, and State of New York, have invented a new and useful Improvement in Dynamo-Electric Machines and Electric Motors, of which the following is a specification.

My invention relates to improvements in dynamo-electric machines or motors of that type in which there are two horseshoe-shaped field-magnets, with an armature adapted to revolve in the magnetic field produced between the poles of said field-magnets.

It consists in features and details of construction and arrangement hereinafter described, and particularly pointed out in the claims which follow this specification.

My invention will be better understood by reference to the accompanying drawings, in which—

Figure 1 is a sectional longitudinal elevation of the machine. Figs. 2 and 3 are vertical cross-sections taken on lines 2 2 and 3 3, Fig. 4. Fig. 4 is a horizontal longitudinal section of the machine, and Fig. 5 is a detail perspective view of the bands for holding the armature windings and disks in place.

Similar letters of reference indicate similar parts wherever used.

M and M' are two horseshoe electro-magnets constituting the field-magnets, having their polar ends A A A' A' joined together by scarf joints and screws $a\ a'$, as clearly shown in Figs. 2 and 4.

S' is the armature-shaft, journaled in non-magnetic bearings G G', located in the neutral yoke portions of the field-magnets. On this shaft is centrally located the armature, in this instance of the Gramme type, borne by a hub D, the exterior circumference of which constitutes the spider upon which a magnetic ring R' is mounted by screws $x\ x$, extending inwardly. This ring D' forms a base or support for the armature-core disks R R, all of which are of substantially the same exterior and interior diameters as it is. These disks may be insulated from each other and the ring R' by asbestus fiber or other material in the well-known manner. They are held in place by a series of bands F F', preferably of magnetic material, Fig. 5, having lugs L L' and scarf-joints, with screw-holes $s\ s'$, adapted to receive screws $x\ x$ and $z\ z$, the former extending through the ring R' unto the spider or hub portion D. This armature rotates in the grooved extension of the field-magnet poles A A', the grooves being swaged or otherwise constructed, so that there are internal projections $A^2\ A^3$ for creating an internal and strengthened magnetic field.

It will be observed that the armature is adapted to rotate in the plane of the field-magnet poles, thus giving a magnetic field of great strength and surface for the exterior surface of the armature, which is greatly strengthened by the interior projecting pole-pieces $A^2\ A^3$. I provide two sets of commutators C C', located at opposite ends of the armature. The field-magnets are so wound as to create neutral points at the yoke-centers, where the armature-shaft is journaled, and like polarities where their ends meet and are joined—that is to say, the upper set of poles A A' $A^2\ A^3$ will be north when the lower set is south.

The winding of the armature is like that of the Gramme ring or any approved ring-armature, and its wires $w\ w$ are commutated at C and C' by commutator-wheels K and K', supported in yokes $y\ y'$, insulated from the commutator-shifter $w$, journaled, as shown, to the armature-axle and having handles H H'.

O O' are the binding-posts running to the exterior circuit.

The field-magnets may be energized in any desired manner, either directly or by a shunt or by an extraneous source, the winding being such as to create neutral points at the axial line bearing the armature-shaft.

With my improved construction of armature and surrounding field-poles I am enabled to obtain a strong magnetic field and to utilize magnetic lines of force on the inside of a Gramme ring, thus bringing into play that portion of the armature-winding which is usually denominated "dead wire."

By making my field-magnets of horseshoe type, each having a solid yoke and core of a single piece, and by arranging the armature to rotate in a plane perpendicular to said field-magnet cores and in a groove between exterior and interior pole-pieces, I secure beneficial results of a material nature, for the reason that I provide a field with the fewest possible magnetic joints and utilize a maximum number of lines of force created in said field.

I am aware that it is old to construct a dynamo-machine in which the field-magnet is made up of two halves joined together at their free polar ends and provided with a ring-armature adapted to revolve in a groove between exterior and interior projecting pole-pieces, the plane of rotation of the armature being in the plane of the field-magnets; but the field-magnets of such machines were constructed of several parts mechanically secured together, thereby decreasing their magnetic efficiency in a manner well understood. I believe it is new with me to combine two field-magnets of the horseshoe type, each having a core of a single piece of magnetic metal, by uniting their free polar ends in such manner as to make a powerful field at their juncture, and it is to this feature my invention is especially directed in conjunction with other details of construction especially indicated in the claims which follow.

What I do claim, and desire to secure by Letters Patent of the United States, is—

1. A dynamo-electric machine having two field-magnets of horseshoe type, said field-magnets being joined together at their polar ends by scarf-splices, substantially as shown, and having interior projecting pole-pieces, in combination with an armature of the Gramme type carried on a shaft journaled at the neutral portions of said field-magnets and adapted to rotate in the groove formed at the junction thereof, said armature having commutators at its opposite ends attached to the shaft, and commutator-brushes connected together by a common connection and journaled to the frame of the machine, whereby said brushes may be adjusted conjointly, substantially as described.

2. An armature for a dynamo-electric machine or motor, having commutators on the opposite ends of its shaft, and commutator brushes or rollers bearing thereon, with means for simultaneously adjusting the brushes in either direction, substantially as described.

3. An armature-core for dynamo-electric machines, consisting of a magnetic ring attached to a hub, in combination with magnetic disks and retaining-bands F F', held in position by screws, substantially as shown and described.

JEAN THEODORE VAN GESTEL.

Witnesses:
H. H. ELDRED,
JAMES PATTUS.